(12) United States Patent
Muramatsu et al.

(10) Patent No.: US 8,779,256 B2
(45) Date of Patent: Jul. 15, 2014

(54) KEYBOARD APPARATUS

(75) Inventors: Shigeru Muramatsu, Mori-machi (JP); Hisashi Takeyama, Hamamatsu (JP)

(73) Assignee: Yamaha Corporation (JP)

( * ) Notice: Subject to any disclaimer, the term of this patent is extended or adjusted under 35 U.S.C. 154(b) by 212 days.

(21) Appl. No.: 13/041,875

(22) Filed: Mar. 7, 2011

(65) Prior Publication Data
US 2011/0232454 A1 Sep. 29, 2011

(30) Foreign Application Priority Data

Mar. 24, 2010 (JP) ................... 2010-067661

(51) Int. Cl.
| | | |
|---|---|---|
| G10C 3/18 | (2006.01) | |
| G10C 3/22 | (2006.01) | |
| G01C 3/22 | (2006.01) | |
| G10C 3/16 | (2006.01) | |
| G10C 3/12 | (2006.01) | |

(52) U.S. Cl.
CPC *G10C 3/225* (2013.01); *G01C 3/22* (2013.01); *G10C 3/16* (2013.01); *G10C 3/12* (2013.01)
USPC ........................................................ 84/236

(58) Field of Classification Search
CPC ............ G10C 3/225; G10C 3/22; G10C 3/16; G10C 3/12; G10C 3/161; G10D 13/085
USPC ........................................................ 84/236
See application file for complete search history.

(56) References Cited

U.S. PATENT DOCUMENTS

| | | | | |
|---|---|---|---|---|
| 210,223 | A | * 11/1878 | Plass ................................. | 84/237 |
| 2,542,309 | A | 2/1951 | Brown | |
| 2,594,967 | A | 4/1952 | Miessner | |
| 3,151,516 | A | * 10/1964 | Bernstein ........................ | 84/240 |
| 3,367,227 | A | 2/1968 | Hill | |
| 3,422,720 | A | 1/1969 | Johnson | |
| 2006/0201308 | A1 | 9/2006 | Tanaka | |

FOREIGN PATENT DOCUMENTS

| | | |
|---|---|---|
| CN | 1831935 A | 9/2006 |
| DE | 19703422 A1 | 8/1998 |
| JP | 2-35195 U | 3/1990 |
| JP | 09274484 A | 10/1997 |
| JP | 2003-263152 A | 9/2003 |
| JP | 2011-203297 A | 10/2011 |

OTHER PUBLICATIONS

Muramatsu, Shigeru, et al. "Keyboard Appartatus," Specification and Drawings of unpublished related co-pending U.S. Appl. No. 13/041,903, filed Mar. 7, 2011, pp. 1-34.
Japanese Office Action cited in Japanese counterpart application no. JP2010-067661, dated Dec. 24, 2013. English translation provided.

* cited by examiner

*Primary Examiner* — Jianchun Qin
(74) *Attorney, Agent, or Firm* — Rossi, Kimms & McDowell LLP

(57) ABSTRACT

A keyboard apparatus capable of enhancing the return capability of hammer assemblies upon key release to improve the capability of repeated key striking and capable of reducing a height size of action units to make the keyboard apparatus compact. The keyboard apparatus includes hammer assemblies each having a butt disposed pivotable about a hammer pivot shaft and a hammer shank extending from the butt. In a non-key-depression state, the hammer shank obliquely extends downward. As viewed from side, a straight line passing though a gravity center position of the hammer assembly and the hammer pivot shaft forms an acute angle less than 45 degrees relative to a horizontal plane in the entirety of a key depression and key release stroke.

6 Claims, 7 Drawing Sheets

KEYBOARD APPARATUS

BACKGROUND OF THE INVENTION

1. Field of the Invention

The present invention relates to a keyboard apparatus in which a hammer assembly is pivoted by key depression through a whippen and a jack.

2. Description of the Related Art

Conventionally, a keyboard apparatus having action units has been known. As disclosed in Japanese Laid-open Patent Publication No. 2003-263152, action units of a keyboard apparatus for upright piano can be configured that when any of keys is depressed, a corresponding whippen is pivoted and a jack is pivoted relative to the whippen to drive a butt, thereby pivoting a corresponding one of hammer assemblies each having a hammer shank and a hammer.

In an action unit for upright piano of this type, the hammer shanks of the hammer assemblies are vertically disposed to enable the hammers to strike respective ones of strings which are vertically stretched. When any of the keys is released from being depressed after striking the string, the corresponding hammer assembly returns to a non-key-depression position by its own weight, a repulsive force of the string, and an urging force of a butt spring.

However, the return capability of the hammer assembly by the own weight is weak since the hammer shank is vertically disposed, and the urging force of the butt spring cannot be made large to avoid a deteriorated key depression feeling. Thus, a delay can be caused in the return of the hammer assembly when the key is repeatedly depressed. This is one of factors that cause the upright piano to have an inferior capability of repeated key striking compared to the grand piano.

Despite that the action units for upright piano having hammer shanks disposed vertically are relative large in height size, no substantial efforts have been made to reduce the height size of the action units.

SUMMARY OF THE INVENTION

The present invention provides a keyboard apparatus capable of enhancing the return capability of hammer assemblies upon key release to improve the capability of repeated key striking and capable of reducing a height size of action units to make the keyboard apparatus compact.

According to a first aspect of this invention, there is provided a keyboard apparatus, which comprises keys each having a front portion located forward of a key fulcrum and each configured to pivot about the key fulcrum when the front portion thereof is operated to be depressed or released, whippens each configured to be driven and pivoted by a rear portion of a corresponding one of the keys, the rear portion being located rearward of the key fulcrum, jacks configured to be pivotable relative to respective ones of the whippens, and hammer assemblies each configured to be driven through a corresponding one of the whippens and a corresponding one of the jacks in response to a corresponding one of the keys being depressed, said hammer assemblies each having a butt driven by a tip end portion of the jack and a hammer shank extending from the butt and each configured to pivot about a pivot center of the hammer assembly when the butt is driven by the tip end portion of the jack, wherein straight lines each passing through a center of gravity of and the pivot center of a corresponding one of the hammer assemblies forms an acute angle less than 45 degrees relative to a horizontal plane during an entirety of a key depression and key release stroke.

With the keyboard apparatus of this invention, the return capability of hammer assemblies upon key release can be enhanced to improve the capability of repeated key striking and a height size of action units can be reduced to make the keyboard apparatus compact.

In the keyboard apparatus of this invention, an axis of the hammer shank of each of the hammer assemblies can form an acute angle less than 45 degrees relative to the horizontal plane during the entirety of the key depression and key release stroke, whereby the height size of the action units can be reduced.

In the keyboard apparatus, the acute angle formed between the axis of the hammer shank and the horizontal plane can become zero degree during the key depression and key release stroke, whereby the height size of the action units can efficiently be reduced.

In the keyboard apparatus, each of the hammer shanks can have a free end portion thereof always located forward of the corresponding one of the butts, whereby the keyboard apparatus can be made compact in a front-rear direction.

The keyboard apparatus can further include jack springs each configured to always urge a corresponding one of the jacks in a pivot direction toward an initial position where the jack intrudes into under a corresponding one of the butts, regulating buttons each configured for contact with a corresponding one of the jacks when a corresponding one of the whippens pivots in a forward direction, which corresponds to a key depression direction, to thereby pivot the tip end portion of the jack in a direction of escape from the butt against the jack spring, and jack stoppers each configured for contact with a contact part of the tip end portion of a corresponding one of the jacks to restrict a pivotal motion of the tip end portion of the jack in the direction of escape from the butt. An escape position of the tip end portion of the jack in a front-to-rear direction, which is defined by the contact part of the jack being in contact with the jack stopper, can become closer to a position of the pivot center of the hammer assembly when the tip end portion is at a lower position. In this case, the jack can be rapidly returned to under the butt, thereby contributing to an improvement in the capability of repeated key striking.

According to a second aspect of this invention, there is provided a keyboard apparatus, which comprises keys each having a front portion located forward of a key fulcrum and operable to be depressed or released, each of the keys being pivotable about the key fulcrum, whippens each configured to be driven and pivoted by a rear portion of a corresponding one of the keys, the rear portion being located rearward of the key fulcrum, jacks configured to be pivotable relative to respective ones of the whippens, hammer assemblies each having a butt driven by a tip end portion of a corresponding one of the jacks and a hammer shank extending from the butt, each of the hammer assemblies being pivotable about a hammer pivot center, jack springs each configured to always urge a corresponding one of the jacks in a pivot direction toward an initial position where the jack intrudes into under a corresponding one of the butts, regulating buttons each configured for contact with a corresponding one of the jacks when a corresponding one of the whippens pivots in a forward direction, which corresponds to a key depression direction, to thereby pivot the tip end portion of the jack in a direction of escape from the butt against the jack spring, and jack stoppers each configured for contact with a contact part of the tip end portion of a corresponding one of the jacks to restrict a pivotal motion of the tip end portion of the jack in the direction of escape from the butt, wherein the contact part of each of the jacks has an oblique surface extending obliquely relative to a proximal end of the jack in a direction from the proximal end of the jack to a pivot center of a corresponding one of the whippens, and an escape position of the tip end portion of the jack in a front-to-rear direction, which is defined by the contact part of the jack being in contact with the jack stopper, becomes closer to a position of the hammer pivot center when the tip end portion is at a lower position.

Further features of the present invention will become apparent from the following description of an exemplary embodiment with reference to the attached drawings.

DESCRIPTION OF THE EMBODIMENTS

The present invention will now be described in detail below with reference to the drawings showing a preferred embodiment thereof.

Figure 1:
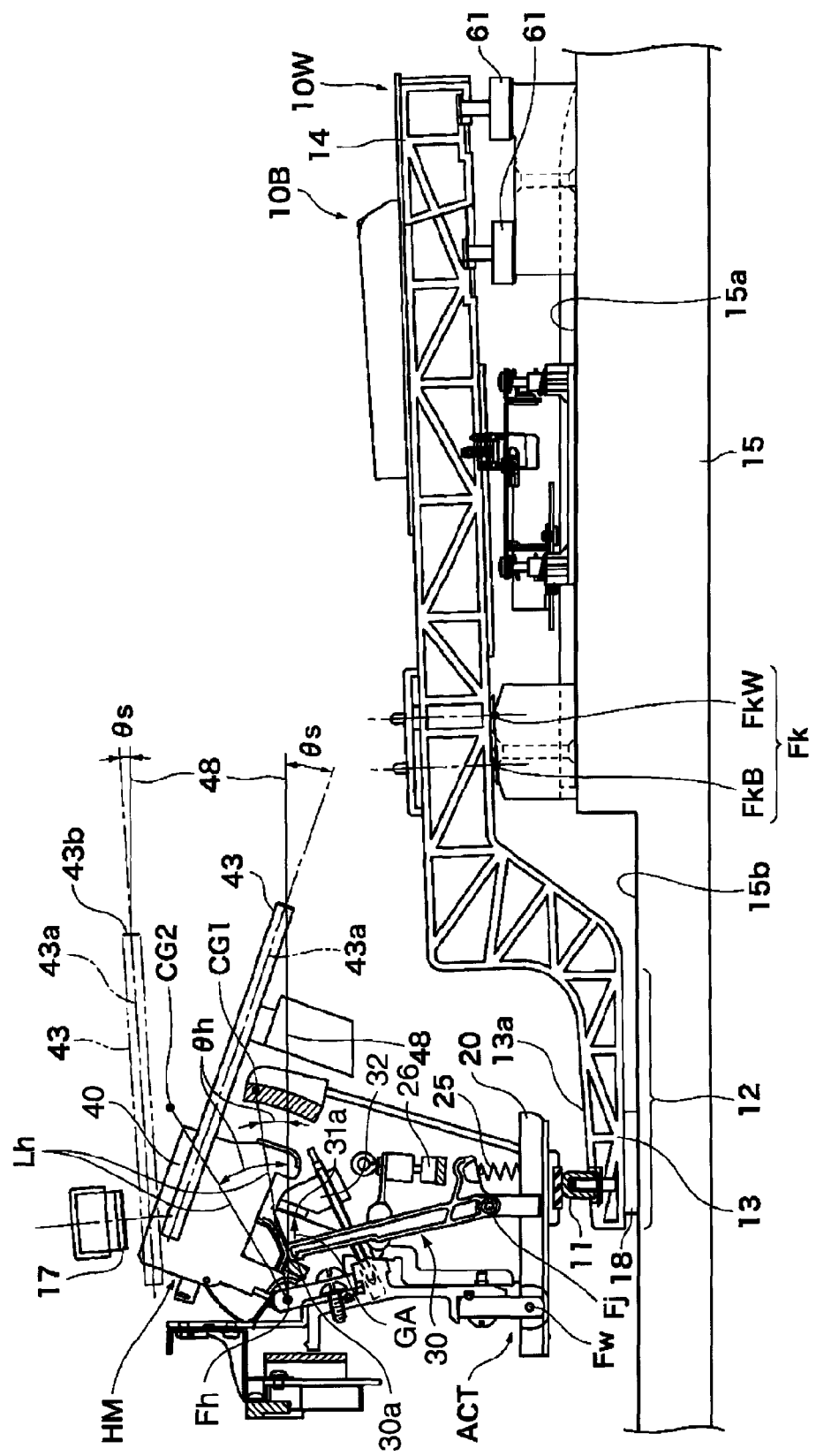
FIG. 1 is a fragmentary vertical section view showing a keyboard apparatus according to one embodiment of this invention.

FIG. 1 shows in vertical section a keyboard apparatus according to one embodiment of this invention. The keyboard apparatus is applied to, e.g., an electronic keyboard instrument. The keyboard apparatus has a keybed 15 on which a plurality of keys 10 (white keys 10W and black keys 10B) are juxtaposed. These keys 10 are each supported by a key fulcrum Fk (FkW or FkB) so as to be vertically pivotable, and each have a front portion 14 (on the right side in FIG. 1) for being depressed or released by a player.

Each key 10 has an upper front part that straightly extends rearward (i.e., to the left in FIG. 1) from a front end of the key 10 to a position slightly rearward of the key fulcrum Fk, a bent part that extends downward from a rear end of the upper front part, and a lower rear part 12 that includes a rear end portion 13 and straightly extends rearward from a lower end of the bent part to a rear end of the key 10. The keybed 15 has a front half disposed below the upper front part of the key 10 and a rear half disposed below the lower rear part 12 of the key 10. The rear half of the keybed 15 has an upper surface 15*b* thereof located at a height position lower than an upper surface 15*a* of the front half of the keybed 15. A key stopper 18 is disposed on the upper surface 15*b* of the keybed 15.

An upper surface 13*a* of the rear end portion 13 (area) of the key 10 nearly horizontally extends at a height position lower than that of the key fulcrum Fk. A capstan 11 is disposed on the upper surface 13*a* of the rear end portion 13 of the key 10. Action units ACT are disposed to correspond to respective ones of the keys 10. Each action unit ACT is disposed above the upper surface 13*a* of the rear end portion 13 of the corresponding key 10. The construction of the action units ACT is common to the white keys 10W and the black keys 10B.

Figure 2:
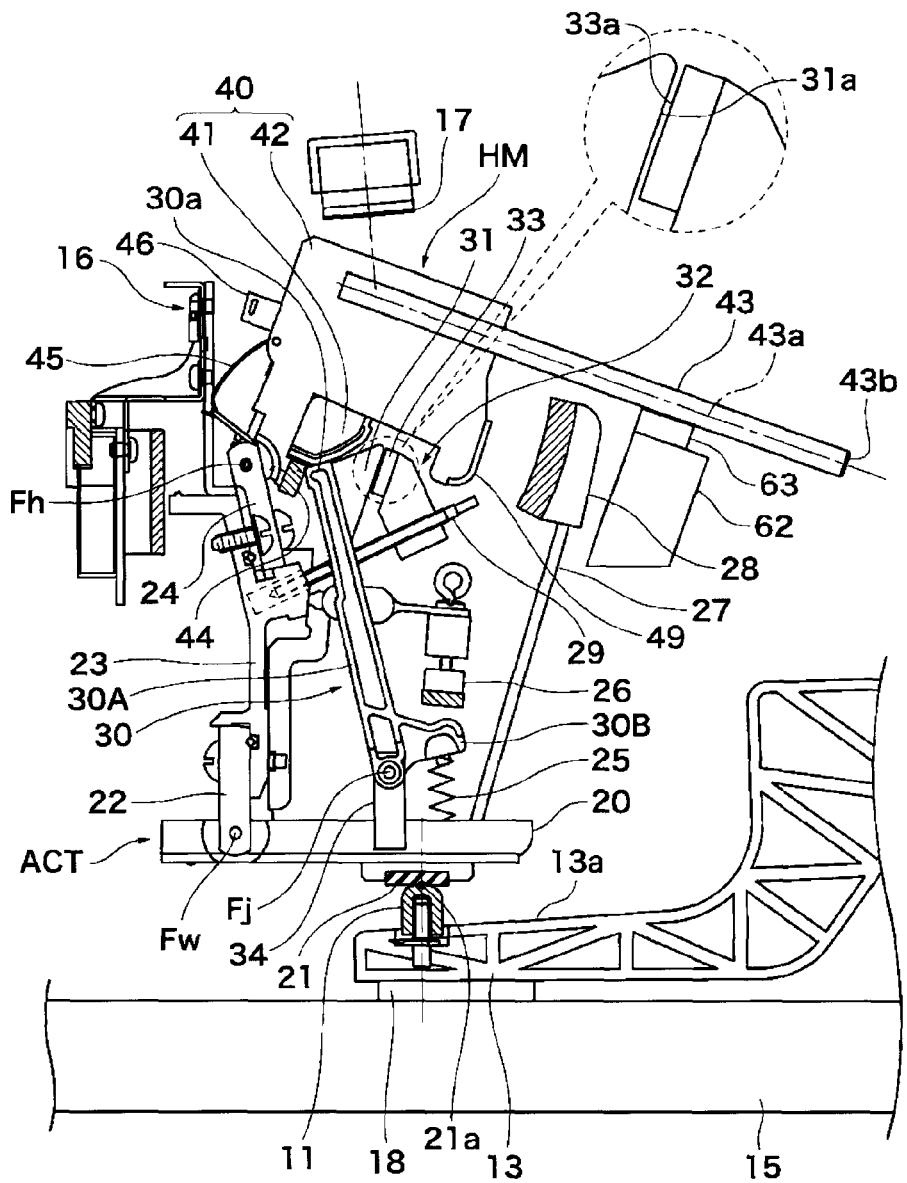
FIG. 2 is an enlarged view showing one action unit of the keyboard apparatus.

FIG. 2 shows one action unit ACT in enlarged view. The action unit ACT mainly includes a whippen 20, a hammer assembly HM, and a jack 30. A whippen flange 22 elongated in the vertical direction is fixed to a lower end of a center rail 23, which is fixed to the keybed 15. A butt flange 24 is fixed to a shoulder of the center rail 23. At a lower end of the whippen flange 22, a rear end of the whippen 20 is pivotally supported by a whippen pivot shaft Fw, so that a front end portion of the whippen 20 is pivotable in the vertical direction (i.e., clockwise and counterclockwise directions in FIG. 2). A whippen cloth 21 is provided at a lower front portion of the whippen 20. The whippen 20 is driven to move upward by the capstan 11 of the corresponding key 10 via the whippen cloth 21. The whippen 20 is in contact with the capstan 11 at a driven point 21*a* of the whippen cloth 21. In a key depression and key release stroke, the driven point 21*a* is slightly displaced in the front-rear direction.

A jack flange 34 is projectingly formed on the whippen 20 at a portion located forward of the whippen pivot shaft Fw. At an upper end of the jack flange 34, the jack 30 is supported by the jack pivot shaft Fj to be pivotable about the shaft Fj in the front-rear direction (i.e., clockwise and counterclockwise directions). The jack 30 is formed into an L shape in side view, and has an arm extending upward (hereinafter, referred to as the large jack portion 30A) and another arm forwardly extending in the horizontal direction (hereinafter, referred to as the small jack portion 30B). A jack spring 25 is interposed between the small jack portion 30B and the front end portion of the whippen 20, and generates an urging force always acting to pivot the jack 30 counterclockwise relative to the whippen 20.

At the front end portion of the whippen 20, there is provided a back check wire (BC rod) 27 that obliquely extends forward. A back check 28 for elastically receiving a catcher 49 of the hammer assembly HM is disposed at an upper end of the back check wire 27.

The hammer assembly HM mainly includes a butt 40 and a hammer shank 43. The butt 40 having a base portion 42 and a struck portion 41 is coupled to the butt flange 24 through the hammer pivot shaft Fh so as to be pivotable in the clockwise and counterclockwise directions. The hammer shank 43 is formed into a straight rod and extended from the base portion 42. In a non-key-depression state, the hammer shank 43 obliquely extends downward. In FIG. 2, reference numerals 43*a* and 43*b* respectively denote an axis of the hammer shank 43 and a free end portion of the hammer shank 43.

A shutter piece 46 is attached to a rear part of the base portion 42 of the butt 40, and the catcher 49 is provided at a lower front part of the base portion 42. A butt felt 44 is attached to a lower rear part of the struck portion 41 of the butt 40. In a non-key-depression state shown in FIG. 2, the hammer assembly HM is urged clockwise by its own weight. A butt spring 45 is provided on the base portion 42, and applies the butt 40 with an urging force acting in the returning direction (clockwise direction).

In a non-key-depression state, the key 10 is in contact at its rear end portion 13 with the key stopper 18, and the whippen cloth 21 of the whippen 20 is in contact with the capstan 11, whereby an initial pivot position of the key 10 and an initial pivot position of the whippen 20 are defined. The keyboard instrument is provided with a hammer rail 62 to which a felt 63 is affixed. An initial pivot position of the hammer assembly HM is defined by the hammer shank 43 being in contact with the hammer rail 62 via the felt 63.

When the hammer assembly HM is at its initial pivot position, the struck portion 41 of the hammer assembly HM is in contact with a tip end portion 30a of the jack 30 (more specifically, a tip end portion of the large jack portion 30A). An initial pivot position of the jack 30 is defined by the tip end portion 30a being in contact with the butt felt 44.

Above the small jack portion 30B of the jack 30, a regulating button 26 is disposed fixedly relative to the center rail 23. In a key depression stroke, the regulating button 26 is brought in contact with the small jack portion 30B to thereby prevent the jack 30, which is moving upward, from further moving upward, and causes the jack 30 to pivot clockwise (or in an escape direction (see FIG. 1)) relative to the whippen 20 against the urging force of the jack spring 25, whereby the jack 30 is allowed to temporarily escape forward from a lower part of the struck portion 41 of the butt 40.

A sensor unit 16 is fixedly disposed relative to a main body of the keyboard instrument. The sensor unit 16 is implemented by an optical sensor such as a photo sensor and outputs a signal that varies according to an amount of light, which in turn varies with movement of the shutter piece 46. In other words, the sensor unit 16 detects an action of the hammer assembly HM to detect an action of the corresponding key 10. Alternatively, an action of the key 10 can be detected based on a result of detection of the action of the key 10 by a key sensor (not shown) and a result of detection by the sensor unit 16. The keyboard instrument is also provided with a musical tone generator (not shown) that generates a musical tone signal for sound generation based on a detection signal output from the sensor unit 16 in response to a key depression operation. The sensor unit 16 is not limited to the optical sensor, but can be implemented by any sensor unit, which is capable of detecting an action of the hammer assembly HM or an action of the key 10.

An upper limit stopper 17 for hammer assemblies HM is disposed fixedly relative to the keyboard instrument body. A limit pivot position of each hammer assembly HM in a pivot direction corresponding to a key depression direction is defined by the base portion 42 of the butt 40 being in contact with the upper limit stopper 17. A key depression stopper 61 is disposed on the keybed 15 below the front portions 14 of the keys 10 (see FIG. 1). A limit pivot position of each key 10 in the key depression direction is defined by the front portion 14 of the key being in contact with the key depression stopper 61. In a state where the whippen 20 and the capstan 11 are in contact at the driven point 21a with each other, the pivot position of the whippen 20 is determined by a pivot position of the key 10.

In the following description on pivotal movements of the whippen 20, jack 30 and hammer assembly HM, the term "forward direction" refers to directions in which the whippen 20, etc. are pivoted from their initial pivot positions in the non-key-depression state in response to key depression, and the term "reverse direction" refers to directions in which the whippen 20, etc. are pivoted to their initial pivot positions in response to key release.

A jack stopper 32 is disposed fixedly relative to the center rail 23, and a stopper felt 33 is affixed to an upper rear portion of the jack stopper 32. A projecting engagement part 31, which is formed into a triangular shape in side view, is provided at a front part of a tip end portion 30a of the jack 30. The projecting engagement part 31 can be formed by, e.g., resin integrally with the jack 30 or can be formed separately from the jack 30 and then affixed to the tip end portion 30a of the jack.

A front surface (or a contact part 31a) of the projecting engagement part 31 of the jack 30 is formed into a flat oblique surface directed forward and downward. A rear surface (or an abutment part 33a) of the stopper felt 33 is formed into a flat oblique surface directed rearward and upward and facing the contact part 31a. As viewed in the front-rear direction, a portion of the contact part 31a of the jack 30 on the side closer to the jack pivot shaft Fj is located on a more rearward side (i.e., located closer to a position assumed by the tip end portion 30a of the jack 30 which is at its initial pivot position). In other words, as viewed in a front-to-rear direction, the oblique surface of the contact part 31a of the jack 30 extends obliquely relative to a proximal end Fj of the jack in a direction from the proximal end Fj of the jack to the whippen pivot center Fw. This also applies to the abutment part 33a of the jack stopper 32. Specifically, a portion of the abutment part 33a on the side closer to the jack pivot shaft Fj is located on a more rearward side in the front-rear direction. A pivot position of the jack 30 relative to the whippen 20 in the forward direction is defined by the contact part 31a of the jack 30 being in contact with the abutment part 33a of the jack stopper 32.

Figure 3A:
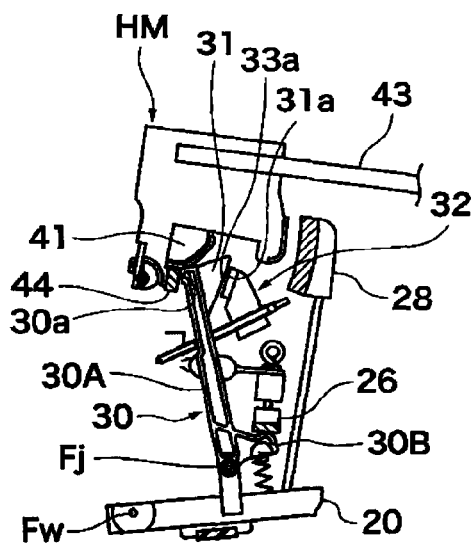
FIGS. 3A to 3D are views showing how an essential part of the action unit operates in a key depression stroke.
Figure 3B:
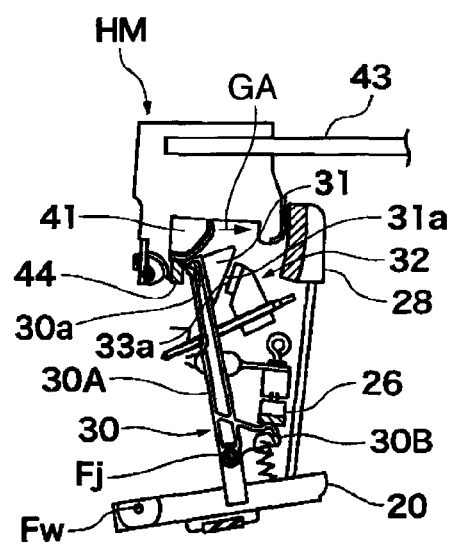
Figure 3C:
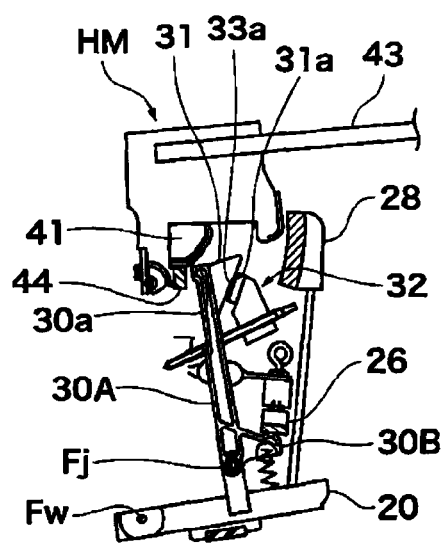

In the following, a description will be given of action of the action unit ACT. FIGS. 3A to 3D show how an essential part of the action unit ACT operates in the key depression stroke. FIG. 4A shows a positional relation between the projecting engagement part 31 of the tip end portion 30a of the jack 30 and the abutment part 33a of the stopper felt 33 of the jack stopper 32. FIG. 4B shows in side view a movement locus of a certain predetermined point on the tip end portion 30a of the jack 30 in the key depression and key release stroke.

Starting from a non-key-depression state shown in FIGS. 1 and 2, when any of the keys 10 is depressed at its front portion 14, the rear end portion 13 of the key 10 is moved upward and the corresponding whippen 20 is pushed up by the capstan 11, whereby the front end portion of the whippen 20 is upwardly pivoted about the whippen pivot shaft Fw (whippen pivot center (whippen pivot fulcrum)). As a result, the jack 30 is moved upward, the struck portion 41 of the butt 40 is pushed up, and the hammer assembly HM is pivoted in the forward direction (counterclockwise direction) about the hammer pivot shaft Fh (hammer pivot center).

When the small jack portion 30B is brought in contact with the regulating button 26 (FIG. 3A), the jack 30 is started to be pivoted relative to the whippen 20 in the forward direction (clockwise direction). The tip end portion 30a of the jack 30 is displaced forwardly (or in the escape direction GA) relative to the struck portion 41 of the butt 40 and moved away from the struck portion 41 (FIG. 3B), whereby the jack 30 is allowed to escape from the butt 40. Prior to the escapement, the key depression is detected by the sensor unit 16 and the shutter piece 46. In the case of ordinary key depression or strong key depression, the hammer assembly HM freely pivots after the escapement, and the base portion 42 of the butt 40 is brought in contact with the upper limit stopper 17 and then rebounded from the stopper 17 (FIG. 3C). In the case of a weak key depression, the hammer assembly HM is not brought in contact with the upper limit stopper 17.

Figure 3D:
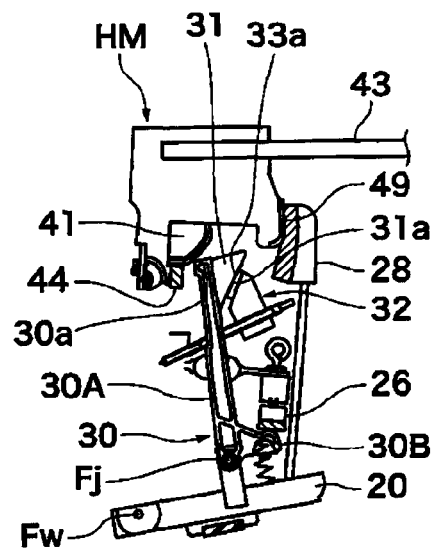
Figure 4A:
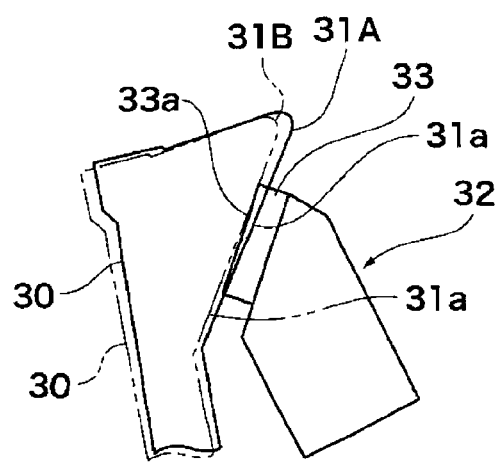
FIG. 4A is a schematic view showing a positional relation in the action unit between a projecting engagement part of a tip end portion of a jack and an abutment part of a stopper felt of a jack stopper.
Figure 4B:
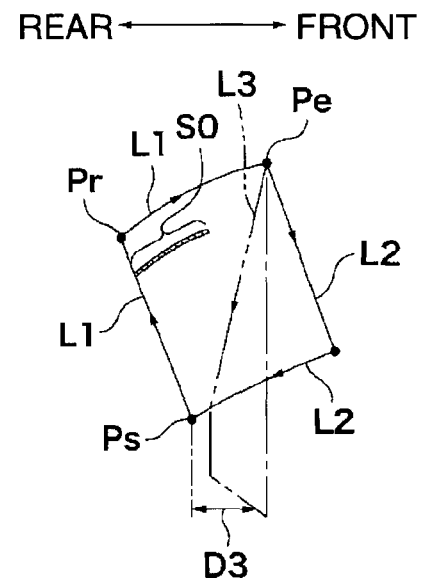
FIG. 4B is a side view showing a movement locus of a certain predetermined point on the tip end portion of the jack in a key depression and key release stroke.

After the escapement, the hammer assembly HM pivots in the reverse direction and is then elastically received at its catcher 49 by the back check 28, whereby a back check state is established (FIG. 3D). During when the key depression state is maintained, the entire action unit ACT becomes stabilized in that position. If the key is depressed up to a position near a key depression stroke end position in the key depression forward stroke, the projecting engagement part 31 of the jack 30 is brought in contact with the stopper felt 33 of the jack stopper 32 at the same timing when the back check state is established. Since the stopper felt 33 has elasticity, the stopper felt is somewhat shrunk and collapsed.

When the small jack portion 30B of the jack 30 is in contact with the regulating button 26, the regulating button 26 prevents the jack 30 from pivoting in the reverse direction. When the key is released, the jack 30 is allowed to pivot in the reverse direction by an amount of separation between the small jack portion 30B and the regulating button 26, so that the jack 30 can return with the aid of the urging force of the jack spring 25. If the key is released after the back check state is stably maintained, the jack 30 is able to immediately return by the allowed amount of pivot motion and the tip end portion 30a of the jack 30 can again intrude into under the struck portion 41 of the butt 40, as with the conventional arrangement.

However, the action unit ACT operates in various manners from key depression to key release. With the conventional arrangement, the jack 30 is sometimes unable to return by the allowed amount of pivot motion in a case, for example, that the key is released in a state where the jack 30 still pivots by inertia in the forward direction. On the other hand, in this embodiment, the contact part 31a of the jack 30 and the abutment part 33a of the jack stopper 32 are formed into the oblique surfaces as described above. Accordingly, in the reverse stroke, the tip end portion 30a of the jack 30 is able to slide along the abutment part 33a of the jack stopper 32 obliquely, as viewed in the front-rear direction, in a state where the projecting engagement part 31 of the tip end portion 30a of the jack is in contact with the abutment part 33a of the jack stopper 32. In the sliding movement of the tip end portion 30a, the front-side limit pivot position (the escape position as viewed in the front-to-rear direction) of the tip end portion 30a is on the more rearward side (i.e., is located closer to a position assumed by the tip end portion 30a of the jack 30 which is at its initial pivot position (or is located closer to a position of the hammer pivot center Fh)) when the tip end portion 30a is at a lower height position.

In a non-key-depression state, a gap is present between the contact part 31a of the jack 30 and the abutment part 33a of the jack stopper 32 (see FIG. 2). As shown in FIG. 4A, in a key depression end state (where the key is fully depressed), the projecting engagement part 31 of the tip end portion 30a of the jack is in contact with the stopper felt 33 of the jack stopper 32, with the stopper felt 33 slightly collapsed, as denoted by reference numeral 31A. In a key release stroke, when the whippen 20 and the jack 30 return, with the contact part 31a being in contact with the abutment part 33a, the projecting engagement part 31 is gradually displaced rearward, as denoted by reference numeral 31B.

In FIG. 4B, symbol Ps denotes a position (start point) assumed by a certain predetermined point on the tip end portion 30a of the jack 30 in a non-key-depression state (FIG. 2), symbol Pr denotes a position (escapement start point) assumed by the predetermined point when the jack 30 is at an escapement start position (see FIG. 3A), and symbol Pe denotes a position (end point) assumed by the predetermined point when the corresponding key 10 is at a fully depressed position (FIG. 3D). Although the predetermined point may be any point on the tip end portion 30a of the jack, it is assumed, for example, that the predetermined point is an uppermost and rearwardmost point on the tip end portion 30a. In a key depression forward stroke, the predetermined point moves from the start point Ps to the escapement start point Pr and to the end point Pe along a forward stroke locus L1 shown in FIG. 4B.

In a conventional keyboard apparatus and in the keyboard apparatus of this embodiment, if any of the keys is released from being depressed after the back check state (FIG. 3D) is stably maintained, the predetermined point moves along a locus similar to the forward stroke locus L1 in a direction opposite to the direction in which the predetermined point moves in the forward stoke. With a conventional keyboard apparatus (in particular, with a keyboard apparatus designed that the jack is brought in contact with the jack stopper in the reverse stroke), in a case where the predetermined point moves along a frontwardmost locus in the key release stroke (reverse stroke), e.g., in a case where the predetermined point moves along a reverse stroke locus L2 and returns to the start point Ps, the jack is brought in contact with the jack stopper and then moved back rearward (to the left in FIG. 4B), and therefore, the resultant reverse stroke locus is slightly shifted toward the inner side of the reverse stroke locus L2 shown in FIG. 4B (i.e., shifted to the left in FIG. 4B).

To appropriately drive the struck portion 41 of the butt 40 by the jack 30, the tip end portion 30a of the jack 30 is required to intrude into under the struck portion 41 at an appropriate position of the struck portion 41, i.e., at a position closer to the initial pivot position than to the escapement position. To this end, it is enough that the predetermined point crosses a region S0 shown in FIG. 4B from below to above in side view when the whippen 20 and the jack 30 are pivoted in the forward direction. Although the region S0 in FIG. 4 is represented by a line that indicates a range in the front-rear direction, the region S0 can be represented by a curved surface (not shown) having a width in the left-right direction.

With a conventional keyboard apparatus, when a same key is rapidly repeatedly depressed such that the key 10 slightly returned from the key depression state is immediately depressed, the jack 30 sometimes fails to push up the struck portion 41 of the butt 40 since the key is depressed again before the predetermined point crosses the region S0.

On the other hand, in this embodiment, a front limit position of the predetermined point (a limit position on the front side that can be assumed by the predetermined point, as viewed in the front-rear direction), which is forcibly defined by the sliding contact between the contact part 31a of the jack 30 and the abutment part 33a of the jack stopper 32, is on a limit locus L3 which is closer to the region S0 as compared to the reverse stroke locus L2. Since a displacement locus of the jack 30 becomes inappropriate if the contact part 31a of the jack 30 is brought in contact with the abutment part 33a of the jack stopper 32 far ahead of completion of key depression in the key depression forward stroke, the limit locus L3 is designed to be as much close to the region S0 (i.e., to the rearward side) as possible in a range where the too early contact between the contact part 31a and the abutment part 33a can be avoided.

A front-side limit position (escape position in the front-to-rear direction) of the tip end portion 30a of the jack 30 for limiting the pivot motion of the jack 30 in the escape direction GA (the limit position is defined by the contact part 31a of the jack 30 being in contact with the abutment part 33a of the jack stopper 32) becomes closer to a position of hammer pivot center Fh (or becomes closer to a position assumed by the tip end portion 30a of the jack 30 which is at the initial position), i.e., becomes a position on a more rearward side when the tip end portion 30a is at a lower height position. Referring to FIG. 4B, a front-rear direction position of the predetermined point on the limit locus L3 becomes closer to the front-rear direction position of the start point Ps (i.e., a distance D3 between the predetermined point and the start point Ps as viewed in the front-rear direction becomes shorter) when the predetermined point on the limit locus L3 is at a lower height position.

If the contact part 31a of the jack 30 is brought in contact with the abutment part 33a of the jack stopper 32, a pivoting force acting in the reverse direction is applied to the jack 30 in a return stroke of the jack 30, so that the jack is provided with momentum. Accordingly, when the same key is repeatedly struck, the predetermined point on the tip end portion 30a of the jack moves along a locus rearward of the limit locus L3 in a forward stroke, and the predetermined point crosses the region S0 in most cases. As a result, the jack 30 rapidly returns to under the struck portion 41 when the key is released from being depressed.

In FIG. 1, symbol CG1 denotes the gravity center position of the hammer assembly HM in the non-key-depression state (initial position), and symbol CG2 denotes the gravity center position of the hammer assembly HM when the hammer assembly HM is at the limit position in the forward pivot direction (i.e., at the position where the base portion 42 of the butt 40 is brought in contact with the upper limit stopper 17). A straight line Lh passing through the gravity center position CG and the hammer pivot shaft Fh forms an acute angle θh less than 45 degrees relative to a horizontal plane 48 in the entirety of the key depression and key release stroke. As a result, the returning capability provided by the own weight of the hammer assembly HM is not close to the returning capability attained in a conventional upright piano, but rather close to that attained in a grand piano. In other words, the returning ability of the hammer assembly HM at key release is enhanced. In a case that a mass portion 47 is provided to the hammer shank 43 as described later with reference to FIGS. 5 and 6, the gravity center position CG is determined based on a mass distribution in the entire hammer assembly HM including the mass portion 47.

The axis 43a of the hammer shank 43 also forms an acute angle θs less than 45 degrees relative to the horizontal plane 48 in the entire key depression and key release stroke. In other words, the hammer shank 43 is extended laterally. As a result, the action units ACT are extremely smaller in height size than upright action units. In particular, the acute angle θs formed between the hammer shank axis 43a and the horizontal plane 48 has a value of zero degree during the key depression and key release stroke. In other words, an inclination direction of the hammer shaft axis 43a changes during the key depression and key release stroke, whereby the height size of the action units ACT can efficiently be reduced.

The upper surface 13a of the rear end portion 13 of each key 10 is located at a height position lower than the key fulcrum Fk, the driven point 21a of the whippen 20 is located at a height position lower than the key fulcrum Fk in a non-key-depression state, and the action unit ACT is disposed above the upper surface 13a of the rear end portion 13 of the key, whereby the upper end of the action unit ACT can be positioned at a low height. Combined with the laterally long hammer shank 43, the low-positioned driven point 21a makes it possible to position the upper end of the action unit ACT at an extremely low height.

Figure 4C:
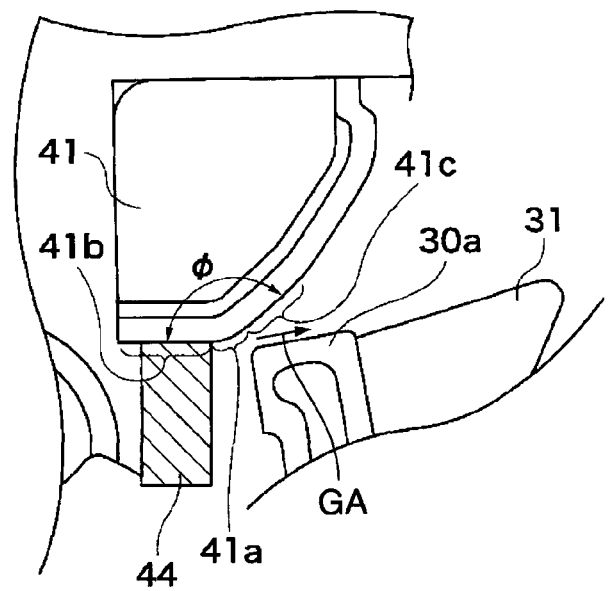
FIG. 4C is an enlarged view showing a struck portion of a hammer assembly of the action unit and the tip end portion of the jack in a non-key-depression state.

FIG. 4C shows in enlarged view the struck portion 41 of the hammer assembly HM and the tip end portion 30a of the jack 30 in a non-key-depression state. As shown in FIG. 4C, the struck portion 41 has a lower part thereof formed not into a simple arcuate side-view shape, but into a side-view shape having first and second flat outer surfaces 41b, 41c that form an obtuse interior angle φ therebetween. Specifically, in the non-key-depression state, the first flat surface 41b extends horizontally and the second flat surface 41c is directed forward and downward. The first and second flat surfaces 41b, 41c are smoothly connected by an R portion 41a formed into a round shape.

When the first flat surface 41b of the struck portion 41 having the aforementioned shape is pushed up by the tip end portion 30a of the jack 30 and the tip end portion 30a is then moved away from the R portion 41a of the struck portion 14 in the escape direction GA, the jack 30 escapes from the butt 40. Since the struck portion 41 is formed with the second flat surface 41c obliquely extending upward from the R portion 41a, a force required to depress the key abruptly decreases upon escapement of the jack 30 from the butt 40. As a result, a feeling of escapement clearer than a conventional one can be attained.

With this embodiment, each action unit ACT is disposed above the upper surface 13a of the rear end portion 13 of the key 10 whose height position is lower than that of the key fulcrum Fk, and the driven point 21a of the whippen 20 in a non-key-depression state is located at a height position lower than that of the key fulcrum Fk. Accordingly, it is possible to position the upper end of the action unit ACT at a low height. Since the whippen pivot shaft Fw as well as the driven point 21a can be disposed at sufficiently low height positions, it becomes easy to design the action units ACT such that an amount of sliding motion at the driven point 21a between the capstan 11 and the whippen cloth 21 in the front-rear direction is reduced as compared to that in conventional action units for upright piano, thereby enhancing the driving efficiency of the whippens 20.

With this embodiment, the straight line Lh passing through the hammer pivot shaft Fh and the gravity center position CG of the hammer assembly HM forms in side view an acute angle θh less than 45 degrees relative to the horizontal plane 48 in the entire key depression and key release stroke, whereby the return capability of the hammer assembly HM at key release can be enhanced to improve the capability of repeated key striking and the height size of the action units ACT can be reduced. Since the axis 43a of the hammer shank 43 forms an acute angle θs less than 45 degrees relative to the horizontal plane 48 in the entire key depression and key release stroke, and in particular, since the acute angle θs becomes zero degree during the key depression and key release stroke, the height size of the action units ACT can efficiently be reduced and the keyboard apparatus can be made compact in the vertical direction.

Since the hammer shank 43 is extended forward and the free end portion 43b of the hammer shank 43 is always positioned forward of the butt 40, the keyboard apparatus can be made compact also in the front-rear direction.

With this embodiment, the contact part 31a of the jack 30 and the abutment part 33a of the jack stopper 32 are each configured that a portion thereof on the side closer to the jack pivot shaft Fj is located closer to a position assumed by the tip end portion 30a of the jack 30 which is at the initial pivot position (FIG. 2). Accordingly, the front-side limit position (the escape position in the front-to-rear direction) of the tip end portion 30a, which is defined by the contact part 31a being in contact with the abutment part 33a, is closer to the position of the hammer pivot center Fh (or closer to the position assumed by the tip end portion 30a of the jack 30 at the initial pivot position) when the tip end portion 30a is located at a lower height position. It is therefore possible to cause the jack 30 to be in contact with the jack stopper 32, thereby forcibly returning the jack 30 to the initial pivot position when the whippen 20 is returned upon key release, whereby the jack 30 is able to rapidly return to under the butt 40. Combined with the enhanced return capability of hammer assembly HM achieved by the acute angle θh less than 45 degrees being formed between the straight line Lh and the horizontal plane 48 in the entire key depression and key release stroke, the rapid return capability of the jack 30 makes it possible to improve the capability of repeated key striking.

In the above-described embodiment, the hammer shanks 43 are extended forward. Alternatively, as with hammer shanks for acoustic grand piano, the hammer shanks 43 can be extended rearward. In the following, a keyboard apparatus having rearwardly extended hammer shanks 43 according to a modification of the embodiment will be described.

Figure 5:
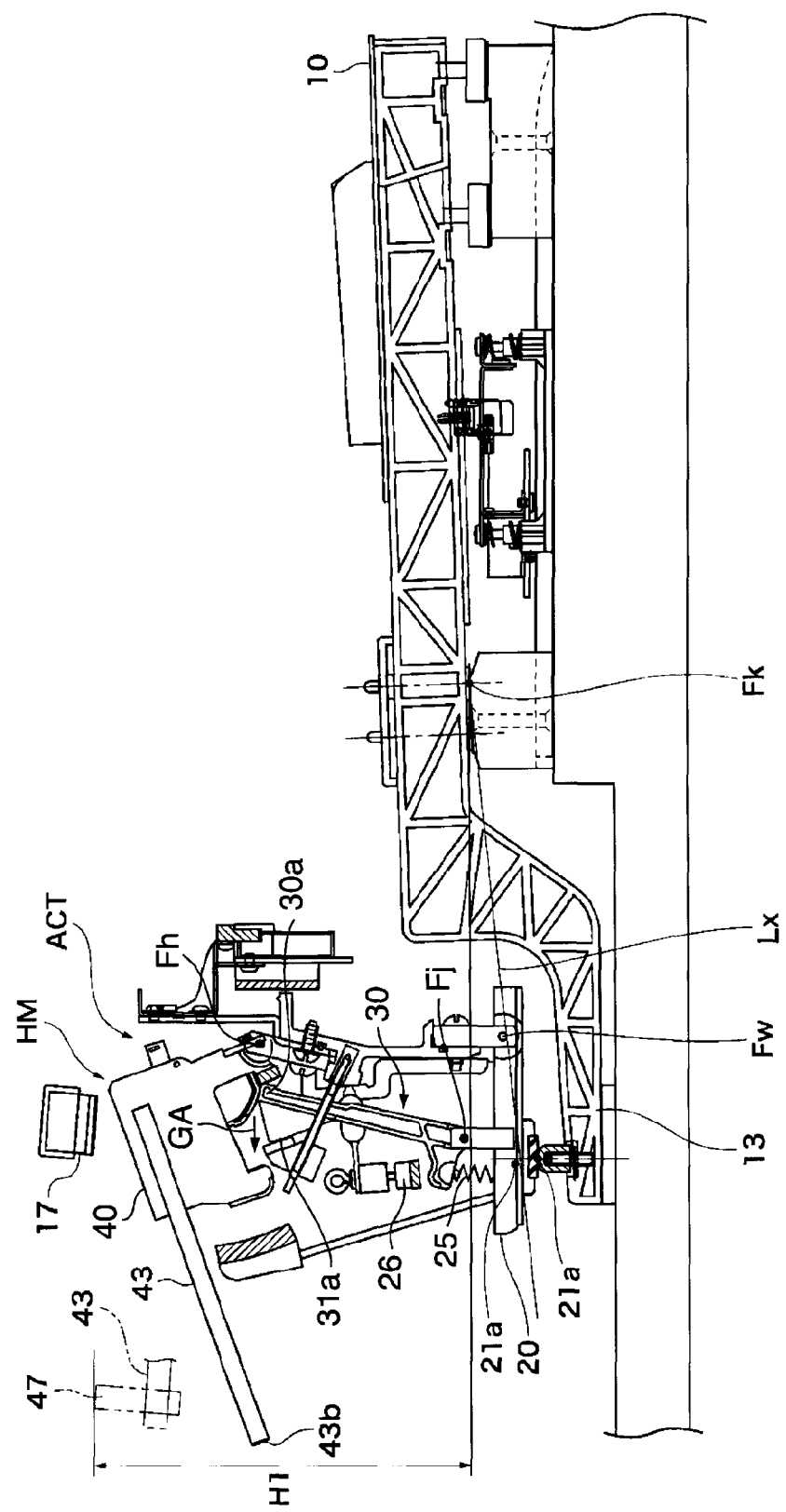
FIG. 5 is a fragmentary vertical section view showing a keyboard apparatus according to a modification of the embodiment.

FIG. 5 shows in vertical section the keyboard apparatus according to the modification. In this modification, the direction to which the action units ACT are directed is reversed in the front-rear direction as compared to the keyboard apparatus shown in FIG. 1. The constructions of the action units ACT and relevant structural elements are the same in other respects as those shown in FIG. 1.

As shown in FIG. 5, the key fulcrum Fk, the whippen pivot shaft Fw, and the driven point 21a are disposed in this order as viewed from front in the front-rear direction and substantially aligned on one straight line. More specifically, as viewed in the height direction, the driven point 21a crosses a straight line Lx passing through the key fulcrum Fk and the whippen pivot shaft Fw during the key depression and key release stroke. In addition, each whippen 20 pivots, in the forward stroke, in the same direction (clockwise) as the pivot direction of the corresponding key 10.

As a result, the amount of sliding motion of each whippen 20 in the front-rear direction at the driven point 21a can be reduced, so that the whippen 20 can properly be driven and the drive efficiency can be enhanced. Since the amount of sliding motion of the whippen 20 is reduced, the whippen 20 can be designed to be short in length but large in pivot angle. In other words, the degree of freedom in design can be improved.

In the example shown in FIG. 1, it is assumed that the keyboard apparatus is applied to an electronic keyboard instrument, and it is therefore unnecessary to provide a construction for striking strings. In the keyboard apparatuses shown in FIGS. 1 and 5, a mass portion 47 formed by, e.g., hammer wood or hammer felt can be provided to the free end portion 43b of each hammer shank 43 as exemplarily shown by an imaginary line in FIG. 5. As with a grand piano, strings (not shown) are stretched horizontally in the front-rear direction rather than vertically.

In the keyboard apparatus provided with the mass portions 47, the height position of an upper end of each action unit ACT is equivalent to a height position of an upper end of the mass portion 47 observed when the corresponding key 10 is fully depressed. In FIG. 5, symbol H1 represents a height size measured from the key fulcrum Fk to the height position of the upper end of the action unit ACT. In the following, the height size H1 is compared with that in an acoustic grand piano.

Figure 6:
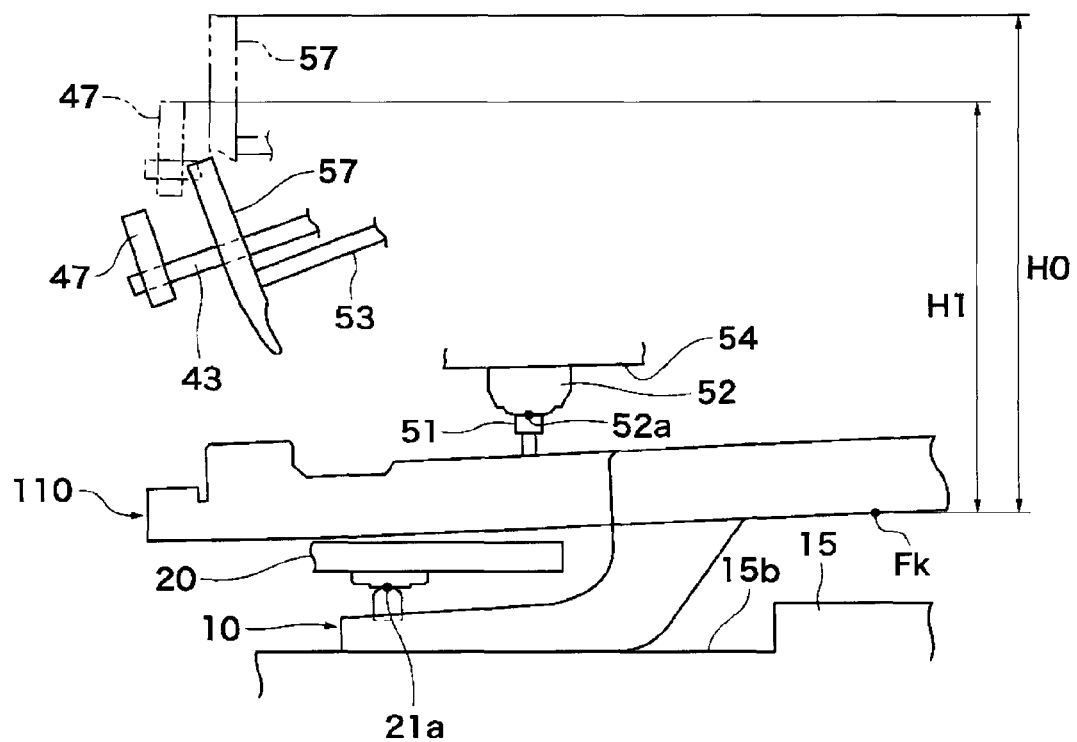
FIG. 6 is a schematic view showing a height size measured from a key fulcrum to an upper end of the action unit of the keyboard apparatus shown in FIG. 5 in comparison with that in an ordinary acoustic grand piano.

FIG. 6 schematically shows a height size measured from the key fulcrum Fk to the upper end of the action unit in the keyboard apparatus shown in FIG. 5 in comparison with that in an ordinary acoustic grand piano. As shown in FIG. 6, an action unit for acoustic grand piano is configured to push up a support heel of a support (whippen) 54 at a driven point 52a by a capstan screw 51 provided in a corresponding key 110. In FIG. 6, symbol H0 represents a height size measured from the key fulcrum Fk to an upper end of a mass portion 57 (corresponding to an upper limit height position of the action unit) in a state where the key 110 is fully depressed. The mass portion 57 is formed by, e.g., hammer felt.

As shown in FIG. 6, the height size H0 in the keyboard apparatus for grand piano and the height size H1 in the keyboard apparatus shown in FIG. 5 satisfy a relation of H0>H1. This indicates that the action unit ACT shown in FIG. 5 can be mounted to a grand piano from the viewpoint of height space. In other words, the action unit ACT can be applied to both of upright piano and grand piano and can also be applied to an acoustic piano configured to actually strike strings as well as applied to an electric piano, and is hence highly versatile.

It is preferable that the action units ACT, when applied to a grand piano, be configured as shown in FIG. 5 where the hammer shanks 43 are extended backward than being configured as shown in FIG. 1 where the hammer shanks 43 are extended forward. Specifically, the free end portions 43b of the hammer shanks 43 are always positioned rearward of the butts 40 in the action units ACT shown in FIG. 5. Therefore, the action units ACT can easily be mounted to a grand piano, while adapting to the grand piano, string-striking positions and installation space of the action units as viewed in the front-rear direction. It is should be noted that it is not impossible for the action units (shown in FIG. 1 and provided with mass portions 47) to be mounted to a grand piano.

In the above-described embodiment, the abutment part 33a of the jack stopper 32 and the contact part 31a of the jack 30 are formed into flat oblique surfaces that can be in sliding contact with each other. However, to enable the jack 30 to rapidly return to under the butt 40 upon key release, the engagement relation between the jack 30 and the jack stopper 32 is not limited to the sliding contact relation. It is enough for the jack 30 and the jack stopper 32 to be engaged in such an engagement relation that as viewed in the front-rear direction, the tip end portion 30a is disposed closer to a position of the hammer pivot center Fh (or closer to a position assumed by the tip end portion 30a of the jack 30 at the initial pivot position) when the tip end portion 30a is at a lower height position.

Figure 7A:
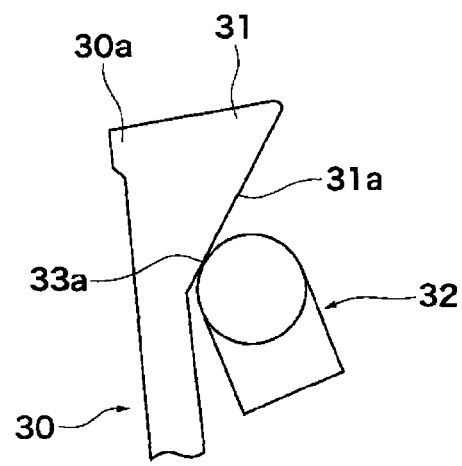
FIGS. 7A and 7B are schematic views each showing an engagement relation between a jack stopper and a jack according to a modification of the embodiment.
Figure 7B:
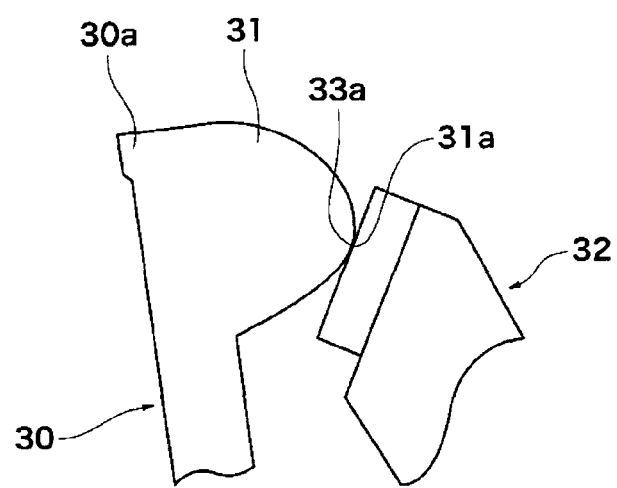

FIGS. 7A and 7B each schematically show an engagement relation between the jack 30 and the jack stopper 32 according to a modification of the above-described embodiment. In the example shown in FIG. 7A, the contact part 31a of the jack 30 is formed into a flat oblique surface, and the abutment part 33a of the jack stopper 32 is formed into a circular arc shape in side view. In the example shown in FIG. 7B, the abutment part 33a of the jack stopper 32 is formed into a flat oblique surface, and the contact part 31a of the jack 30 is formed into a circular arc shape in side view. The above-described engagement relation in which the tip end portion 30a is disposed closer to a position of the hammer pivot center Fh (or closer to a position assumed by the tip end portion 30a of the jack 30 at the initial pivot position) when the tip end portion 30a is at a lower height position can easily be satisfied by forming at least one of the contact part 31a and the abutment part 33a into a flat oblique surface. However, it is not inevitably necessary to form the contact part 31a and/or the abutment part 33a into a flat oblique surface. For example, the contact part 31a and/or the abutment part 33a can be formed into a curved surface. The engagement relation between the jack 30 and the jack stopper 32, by which the limit locus L3 (see FIG. 4B) representing a limited pivotal motion of the jack 30 is determined, can be envisaged in various forms as understood from the foregoing description.

In the action unit ACT where the hammer shank 43 is extended laterally, if a too large force (key depression force) is required to pivot the hammer assembly HM in the forward direction, a spring or other mechanism to provide an urging force acting in the forward direction can be added to the butt 40 of the hammer assembly HM. As with an ordinary upright piano, a bridle wire and a bridle tape can be provided, so that the hammer assembly HM pivots in the reverse direction to follow a pivot motion of the whippen 20 in the reverse direction, whereby the hammer assembly HM can be prevented from rebounding, a string can be prevented from being struck repeatedly, and the hammer assembly HM can rapidly be returned to its initial pivot position.

The present invention is not limited to the above-described embodiment and modifications, and can be modified variously without departing from the gist of the invention, and the constructions of the embodiment and modifications can be appropriately combined.

What is claimed is:

1. A keyboard apparatus comprising:
   keys each having a front portion located forward of a key fulcrum and each configured to pivot about the key fulcrum when the front portion thereof is operated to be depressed or released;
   whippens each configured to be driven and pivoted by a rear portion of a corresponding one of said keys, the rear portion being located rearward of the key fulcrum;
   jacks each configured to be pivotable relative to a corresponding one of said whippens;
   hammer assemblies each having a butt including a base portion and a struck portion driven by a tip end portion of corresponding one of the jacks, and a hammer shank extending from the base portion of the butt, and each configured to pivot exclusively about a single corresponding pivot center;
   back checks each located below an axis of the hammer shank of the corresponding one of the hammer assemblies and fixed to the corresponding one of the whippens; and
   back check-catching portions each disposed on the base portion of the butt of the corresponding one hammer assembly, and configured to catch the corresponding back check when the corresponding one hammer assembly is pivoted in a key release direction,
   wherein a first acute angle of a straight line passing through a center of gravity of and the pivot center of the corresponding one hammer assembly relative to a horizontal plane is less than 45 degrees during an entirety of a key depression and a key release stroke, and a second acute angle of the axis of the hammer shank relative to the horizontal plane is less than 45 degrees during the entirety of the key depression stroke and the key release stroke,
   wherein the axis of the hammer shank is offset relative to the pivot center of the corresponding one hammer assembly, and an offset amount of the axis of the hammer shank is set so that the hammer shank always does not contact the back check, and
   wherein the back check, the struck portion, and the pivot center of the corresponding one hammer assembly are arranged in this order with respect to a front-rear-direction.

2. The keyboard apparatus according to claim 1, wherein the second acute angle becomes zero degree during the key depression and the key release stroke.

3. The keyboard apparatus according to claim 1, wherein each of said hammer shanks has a free end portion thereof always located forward of the corresponding one of said butts.

4. The keyboard apparatus according to claim 1, wherein the pivot center of each of the hammer assemblies is located in the respective butt.

5. A keyboard apparatus including:
   keys each having a front portion located forward of a key fulcrum and each configured to pivot about the key fulcrum when the front portion thereof is operated to be depressed or released;
   whippens each configured to be driven and pivoted by a rear portion of a corresponding one of said keys, the rear portion being located rearward of the key fulcrum;
   jacks configured to be pivotable relative to respective ones of said whippens;
   hammer assemblies each configured to be driven through a corresponding one of said whippens and a corresponding one of said jacks in response to a corresponding one of said keys being depressed, said hammer assemblies each having a butt driven by a tip end portion of the jack and a hammer shank extending from the butt and each configured to pivot about a pivot center of the hammer assembly when the butt is driven by the tip end portion of the jack;
   jack springs each configured to always urge a corresponding one of said jacks in a pivot direction toward an initial position where the jack intrudes into under a corresponding one of said butts;
   regulating buttons each configured for contact with a corresponding one of said jacks when a corresponding one of said whippens pivots in a forward direction, which corresponds to a key depression direction, to thereby pivot the tip end portion of the jack in a direction of escape from the butt against the jack spring; and
   jack stoppers each configured for contact with a contact part of the tip end portion of a corresponding one of said jacks to restrict a pivotal motion of the tip end portion of the jack in the direction of escape from the butt,
   wherein an escape position of the tip end portion of the jack in a front-to-rear direction, which is defined by the contact part of the jack being in contact with the jack stopper, becomes closer to a position of the pivot center of the hammer assembly when the tip end portion is at a lower position, and
   wherein a straight line passing through a center of gravity of and the pivot center of a corresponding one of said hammer assemblies forms an acute angle less than 45 degrees relative to a horizontal plane during an entirety of a key depression and a key release stroke.

6. A keyboard apparatus comprising:
   keys each having a front portion located forward of a key fulcrum and operable to be depressed or released, each of said keys being pivotable about the key fulcrum;
   whippens each configured to be driven and pivoted by a rear portion of a corresponding one of said keys, the rear portion being located rearward of the key fulcrum;
   jacks configured to be pivotable relative to respective ones of said whippens;
   hammer assemblies each having a butt driven by a tip end portion of a corresponding one of said jacks and hammer shank extending from the butt, each of said hammer assemblies being pivotable about a hammer pivot center;
   jack springs each configured to always urge a corresponding one of said jacks in a pivot direction toward an initial position where the jack intrudes into under a corresponding one of said butts;
   regulating buttons each configured for contact with a corresponding one of said jacks when a corresponding one of said whippens pivots in a forward direction, which corresponds to a key depression direction, to thereby pivot the tip end portion of the jack in a direction of escape from the butt against the jack spring; and jack stoppers each configured for contact with a contact part of the tip end portion of the corresponding one of said jacks to restrict a pivotal motion of the tip end portion of the jack in the direction of escape from the butt, wherein the contact part of each of said jacks has an oblique surface extending obliquely relative to a proximal end of the jack in a direction from the proximal end of the jack to a pivot center of a corresponding one of said whippens, and an escape position of the tip end portion of the jack in a front-to-rear direction, which is defined by the contact part of the jack being in contact with the jack stopper, becomes closer to a position of the hammer pivot center when the tip end portion is at a lower position.

* * * * *